US010384847B2

(12) United States Patent
Mogna

(10) Patent No.: US 10,384,847 B2
(45) Date of Patent: Aug. 20, 2019

(54) MATERIAL IMPERMEABLE TO HUMIDITY AND OXYGEN FOR PACKAGING DIETARY PRODUCTS, COSMETICS AND MEDICINAL SPECIALITIES

(71) Applicant: PROBIOTICAL NORTH AMERICA INC., Chicago, IL (US)

(72) Inventor: Giovanni Mogna, Novara (IT)

(73) Assignee: PROBIOTICAL NORTH AMERICA INC., Chicago, IL (US)

( * ) Notice: Subject to any disclaimer, the term of this patent is extended or adjusted under 35 U.S.C. 154(b) by 970 days.

(21) Appl. No.: 14/346,941

(22) PCT Filed: Sep. 21, 2012

(86) PCT No.: PCT/IB2012/001848
§ 371 (c)(1),
(2) Date: Mar. 24, 2014

(87) PCT Pub. No.: WO2014/023995
PCT Pub. Date: Feb. 13, 2014

(65) Prior Publication Data
US 2014/0231300 A1    Aug. 21, 2014

(30) Foreign Application Priority Data
Sep. 23, 2011   (IT) ................................ MI2011A1718

(51) Int. Cl.
| B32B 27/08 | (2006.01) |
| B65D 75/32 | (2006.01) |
| B32B 15/20 | (2006.01) |
| A61J 1/03 | (2006.01) |
| B32B 15/082 | (2006.01) |
| B32B 15/088 | (2006.01) |
| B65B 25/00 | (2006.01) |
| B32B 15/04 | (2006.01) |
| B32B 15/085 | (2006.01) |
| B65D 75/30 | (2006.01) |

(52) U.S. Cl.
CPC ............ B65D 75/327 (2013.01); A61J 1/035 (2013.01); B32B 15/043 (2013.01); B32B 15/082 (2013.01); B32B 15/085 (2013.01); B32B 15/088 (2013.01); B32B 15/20 (2013.01); B65B 25/00 (2013.01); B32B 2250/04 (2013.01); B32B 2250/05 (2013.01); B32B 2307/7244 (2013.01); B32B 2307/7246 (2013.01); B32B 2439/80 (2013.01); B65D 75/30 (2013.01); B65D 75/325 (2013.01); Y10T 428/12542 (2015.01)

(58) Field of Classification Search
CPC ..... B32B 27/36; B65D 81/343; Y10T 428/13; Y10T 428/2817
USPC ................................................ 428/35.7, 34.1
See application file for complete search history.

(56) References Cited

U.S. PATENT DOCUMENTS

| 3,819,383 | A | 6/1974 | Squire et al. |
| 3,819,838 | A | 6/1974 | Smith et al. |
| 4,187,321 | A | 2/1980 | Mutai et al. |
| 4,332,790 | A | 6/1982 | Sozzi et al. |
| 4,670,272 | A | 6/1987 | Chen et al. |
| 4,853,211 | A | 8/1989 | Kurobe et al. |
| 5,071,976 | A | 12/1991 | Stirling et al. |
| 5,343,672 | A | 9/1994 | Kearney et al. |
| 5,413,960 | A | 5/1995 | Dobrogosz et al. |
| 5,466,463 | A | 11/1995 | Ford et al. |
| 6,262,019 | B1 | 7/2001 | Keller et al. |
| 6,277,370 | B1 | 8/2001 | Cavaliere et al. |
| 6,706,347 | B1 | 3/2004 | Kürzinger et al. |
| 8,257,693 | B2 | 9/2012 | Ranganathan et al. |
| 9,005,682 | B2 | 4/2015 | Sprenger et al. |
| 9,125,768 | B2 | 9/2015 | Husmark et al. |
| 9,492,377 | B2 | 11/2016 | Mogna et al. |
| 2002/0022019 | A1 | 2/2002 | Laulund et al. |
| 2002/0044968 | A1 | 4/2002 | Van Lengerich et al. |
| 2004/0185032 | A1 | 9/2004 | Burrell et al. |
| 2004/0208863 | A1 | 10/2004 | Versalovic et al. |
| 2005/0017013 | A1* | 1/2005 | Peisach ................. B65D 1/42 220/609 |
| 2005/0031814 | A1* | 2/2005 | Dawes .................. B32B 27/36 428/35.7 |
| 2005/0095232 | A1 | 5/2005 | Volkmann et al. |
| 2006/0039973 | A1 | 2/2006 | Aldritt et al. |
| 2006/0121571 | A1 | 6/2006 | Klaenhammer et al. |

(Continued)

FOREIGN PATENT DOCUMENTS

| CA | 2221426 | 5/1998 |
| CA | 2739345 A1 | 4/2010 |

(Continued)

OTHER PUBLICATIONS

International Search Report dated Dec. 3, 2012 for International patent application PCT/2012/001848 filed on Sep. 21, 2012.

(Continued)

*Primary Examiner* — Ellen S Wood
(74) *Attorney, Agent, or Firm* — Steinfl + Bruno LLP

(57) ABSTRACT

The present disclosure refers to a material impermeable to water vapor and oxygen for packaging dietary products, cosmetics and medicinal specialities. In particular, the present disclosure refers to primary packaging in the form of blister packs or sachets, which comes into direct contact with the formulations of medicinal specialities and dietary products and cosmetics, such as, for example, tablets, pills, pessaries, powders, granules, suppositories, rigid capsules and soft capsules (also known as soft gel capsules).

20 Claims, No Drawings

(56) References Cited

U.S. PATENT DOCUMENTS

| | | |
|---|---|---|
| 2006/0233774 A1 | 10/2006 | Lim et al. |
| 2007/0122397 A1 | 5/2007 | Sanguansri et al. |
| 2007/0148149 A1 | 6/2007 | Boettner et al. |
| 2007/0207132 A1 | 9/2007 | Speelmans et al. |
| 2007/0269515 A1 | 11/2007 | Henriksen et al. |
| 2008/0175899 A1 | 7/2008 | Ross et al. |
| 2008/0187628 A1 | 8/2008 | Champion et al. |
| 2008/0193485 A1 | 8/2008 | Gorbach et al. |
| 2009/0041736 A1 | 2/2009 | Sprenger et al. |
| 2009/0061164 A1 | 3/2009 | Pasbrig et al. |
| 2009/0170185 A1 | 7/2009 | Hayakawa et al. |
| 2009/0175843 A1 | 7/2009 | Gans et al. |
| 2009/0226548 A1 | 9/2009 | Minatelli et al. |
| 2009/0252709 A1 | 10/2009 | Nose et al. |
| 2009/0294319 A1 | 12/2009 | Nägeli et al. |
| 2010/0003369 A1* | 1/2010 | Ter Haar ............... A23K 1/009 426/61 |
| 2010/0092440 A1 | 4/2010 | Strozzi et al. |
| 2011/0020400 A1 | 1/2011 | MacSharry et al. |
| 2011/0177198 A1 | 7/2011 | Songisepp et al. |
| 2011/0178488 A1 | 7/2011 | Balazs et al. |
| 2012/0195868 A1 | 8/2012 | Lathan et al. |
| 2012/0207929 A1 | 8/2012 | Yoo et al. |
| 2014/0065116 A1 | 3/2014 | Mogna |
| 2014/0072543 A1 | 3/2014 | Mogna et al. |
| 2014/0105874 A1 | 4/2014 | Mogna et al. |
| 2014/0127164 A1 | 5/2014 | Mogna et al. |
| 2014/0328932 A1 | 11/2014 | Mogna et al. |
| 2015/0017128 A1 | 1/2015 | Mogna et al. |
| 2016/0106787 A1 | 4/2016 | Mogna et al. |
| 2016/0184372 A1 | 6/2016 | Mogna et al. |
| 2017/0014335 A1 | 1/2017 | Mogna et al. |

FOREIGN PATENT DOCUMENTS

| | | |
|---|---|---|
| CN | 1345589 A | 4/2002 |
| CN | 1853508 A | 11/2006 |
| CN | 101432007 A | 5/2009 |
| CN | 105163747 A | 12/2015 |
| EA | 200200287 A1 | 6/2002 |
| EA | 010981 B1 | 12/2008 |
| EA | 011952 B1 | 6/2009 |
| EP | 0002692 | 7/1979 |
| EP | 0845350 | 6/1998 |
| EP | 0956858 A1 | 11/1999 |
| EP | 1600060 A1 | 11/2005 |
| EP | 1600061 A1 | 11/2005 |
| EP | 1840205 A1 | 10/2007 |
| EP | 2000530 A1 | 12/2008 |
| EP | 2210505 A1 | 7/2010 |
| EP | 2269465 A1 | 1/2011 |
| EP | 2338976 A1 | 6/2011 |
| EP | 2360237 A1 | 8/2011 |
| EP | 2626076 A1 | 8/2013 |
| JP | 2001258549 A | 9/2001 |
| JP | 2003522731 A | 7/2003 |
| JP | 2006519014 A | 8/2006 |
| JP | 2008529535 A | 8/2008 |
| JP | 2009520470 A | 5/2009 |
| JP | 2010511033 A | 4/2010 |
| JP | 2010187670 A | 9/2010 |
| JP | 2013009681 A | 1/2013 |
| KZ | 11784 A | 8/2002 |
| KZ | 17967 B | 6/2011 |
| RU | 2150268 C1 | 6/2000 |
| RU | 2203946 C1 | 5/2003 |
| RU | 2215656 C2 | 11/2003 |
| RU | 2303058 C2 | 7/2007 |
| RU | 2338511 C2 | 11/2008 |
| RU | 2007147945 A | 7/2009 |
| RU | 2373274 C1 | 11/2009 |
| RU | 2008118418 A1 | 11/2009 |
| RU | 2388479 C1 | 5/2010 |
| WO | 94/12142 | 6/1994 |
| WO | 97/29762 A1 | 8/1997 |
| WO | 99/49877 A2 | 10/1999 |
| WO | 00/35465 A2 | 6/2000 |
| WO | 00/72855 A2 | 12/2000 |
| WO | 03/090546 A1 | 11/2003 |
| WO | 2004/089278 A2 | 10/2004 |
| WO | 2004/101770 A1 | 11/2004 |
| WO | 2006/013588 A1 | 2/2006 |
| WO | 2006/073329 A1 | 7/2006 |
| WO | 2006/091103 A2 | 8/2006 |
| WO | 2007/029773 A1 | 3/2007 |
| WO | 2007/100765 A2 | 9/2007 |
| WO | 2007/125558 A1 | 11/2007 |
| WO | 2008/038075 A2 | 4/2008 |
| WO | 2008/065492 A2 | 6/2008 |
| WO | 2008/153377 A1 | 12/2008 |
| WO | 2009/138218 | 11/2009 |
| WO | 2010/023248 A1 | 3/2010 |
| WO | 2010/033768 A1 | 3/2010 |
| WO | 2010/099824 A1 | 9/2010 |
| WO | 2010/103374 A2 | 9/2010 |
| WO | 2010/133761 A1 | 11/2010 |
| WO | 2010/136891 A1 | 12/2010 |
| WO | 2011/012932 A1 | 2/2011 |
| WO | 2011/017040 A1 | 2/2011 |
| WO | 2011/110918 A1 | 9/2011 |
| WO | 2012/001440 A1 | 1/2012 |
| WO | 2012/101500 A1 | 8/2012 |
| WO | 2013/034974 A1 | 3/2013 |
| WO | 2013/034975 A1 | 3/2013 |
| WO | 2013/050831 A1 | 4/2013 |

OTHER PUBLICATIONS

International Written Opinion dated Dec. 3, 2012 for International patent application PCT/2012/001848 filed on Sep. 21, 2012.

Decision to Grant for Russian Patent Application No. 2014110640/05 filed Sep. 21, 2012 on behalf of Probiotical S.P.A. dated Sep. 2, 2016. 9 pages.

7th Probiotics, Prebiotics & New Foods Proceedings and Abstracts, Retrieved from Internet, [Retrieved on Sep. 2013] URL:<http:www.probioticsprebiotics-newfood.com=""pdf=""7thpmbioticsprebioticsnewfood.pdf=""> Sep. 2013, 206 pages,</http:>.

Alam M., et al., "Development and Evaluation of Acid-buffering Bioadhesive Vaginal Tablet for Mixed Vaginal Infections," AAPS PharmSciTech, Dec. 2007, vol. 8 (4), 8 pages.

Aloisio I., et al., "Characterization of *Bifidobacterium* spp, Strains for the Treatment of Enteric Disorders in Newborns," Applied Microbiology and Biotechnology, Dec. 2012, vol. 96 (6), 19 pages.

Al-Wahsh I., et al., "Acute Probiotic Ingestion Reduces Gastrointestinal Oxalate Absorption in Healthy Subjects," Urological Research, 2012, Vol, 40 (3), 6 pages,.

Amaretti A., et al., "Antioxidant Properties of Potentially Probiotic Bacteria: In Vitro and in Vivo Activities," Applied Microbiology and Biotechnology, Jan. 2013, vol. 97 (2), 11 pages.

Antao E.M., et al., "The Chicken as a Natural Model for Extraintestinal Infections caused by Avian Pathogenic *Escherichia Coli* (APEC)," Microbial Pathogenesis, Nov.-Dec. 2008, vol. 45 (5-6), 9 pages.

Anukam K.C., et al., "*Lactobacillus Plantarum* and *Lactobacillus Fermentum* with Probiotic Potentials Isolated from the Vagina of Healthy Nigerian Women," Research Journal of Microbiology, 2007, vol. 2 (1), 8 pages.

Baluka et al., "PCR-Based Detection of Genes Responsible for Oxalate Detoxification in Probiotic Microorganisms," Annual Meeting of the Illinois State Academy of Sciences, 2008 Retrieved from the Internet: [https://www.eiu.edu/biology/posters/2008-11,pdf], 1 page.

Barber A.E., et al., "Strengths and Limitations of Model Systems for the Study of Urinary Tract Infections and Related Pathologies," Microbiology and Molecular Biology Reviews, Jun. 2016, vol. 80 (2), 18 pages.

Bespalov V.G., et al., "Biologically active food supplements," Kafedra, 2000, 12 pages.

(56) References Cited

OTHER PUBLICATIONS

Best E.L., et al., "Models for the Study of Clostridium Difficile Infection," Gut Microbes, Mar.-Apr. 2012, vol. 3 (2), 23 pages.
Bordoni A., et al., "Cholesterol-lowering Probiotics: in Vitro Selection and in Vivo Testing Ofbifidobacteria," Applied Microbiology and Biotechnology, Sep. 2013, vol. 97 (18), 12 pages.
Breach Action Filed by the General Secretary of the Andean Community Against the Republic of Peru, Process 89-AI-2000 (Gaceta Oficial, del Acuerdo de Cartagena, Sumario, Tribunal de Justicia de la Comunidad Andina), Ano XVIII, Numero 722, Lima, Oct. 12, 2001, 44 pages. (Spanish with English Abstract).
Briczinski E., et al., "Strain-specific Genotyping of *Bifidobacterium Animalis* Subsp *Lactis* by Using Single-nucelotide Polymorphisms, Insertions and Deletions," Applied and Environmental Microbiology, Dec. 2009, vol. 75 (23), 8 pages.
Broadbent J.R., et al., "Biochemistry, Genetics, and Applications of Exopolysaccharide Production in Streptococcus Thermophiles: A Review," Journal of Dairy Science, Feb. 2003, vol. 86 (2), 17 pages.
Busch N.A., et al., "A Model of Infected Burn Wounds Using *Escherichia Coli* O18:K1:H7 for the Study of Gram-Negative Bacteremia and Sepsis," infection and Immunity, Jun. 2000, vol. 68 (6), 3 pages.
Candela M., et al., "Interaction of Probiotic *Lactobacillus* and *Bifidobacterium* Strains With Human Intestinal Epithelial Cells: Adhesion Properties, Competition Against Enteropathogens and Modulation of IL-8 Production," International Journal of Food Microbiology, Jul. 2008, vol. 125 (3), 7 pages.
Candela M., et al., "High Taxonomic Level Fingerprint of the Human Intestinal Microbiota by Ligase Detection Reaction— Universal Array Approach," BMC Microbiology, Apr. 2010, vol. 10 (116), 17 pages.
Castro-Leyva V., et al., "Preserved Ex Vivo Inflammatory Status in Decidual Cells from Women with Preterm Labor and Subclinical Intrauterine Infection," PLoS One, Aug. 2012, vol. 7 (8), 6 pages.
Champagne C.P., et al., "The Determination of Viable Counts in Probiotic Cultures Microencapsulated by Spray-Coating," Food Microbiology, Dec. 2010, vol. 27 (8), 8 pages.
Cheikhyoussef A., et al., "Antimicrobial Activity and Partial Characterization of Bacteriocin-likeinhibitory Substances(BLIS) Produced by *Bifidobacterium Infantis* BCRC 14602," Food Control, Jun. 2009, vol. 20 (6), 7 pages.
Chen H.L. et al., "Probiotic *Lactobacillus* easel Expressing Human Lactoferrin Elevates Antibacterial Activity in the Gastrointestinal Tract," Biometals, Jun. 2010, vol. 23 (3), 12 pages.
Collado M.C., et al., "Probiotic Strains and Their Combination Inhibit In Vitro Adhesion of Pathogens to Pig Intestinal Mucosa," Current Microbiology, Springer-Verlag, NE, Jul. 2007, vol. 55 (3), 1 pages.
Cremonini F., et al., "Effect of Different Probiotic Preparation son Anti-Helicobacter pylori Therapy-Related Side Effects: A Parallel Group, Triple Blind, Placebo-Controlled Study," American Journal of Gastroenterology, 2002, vol. 97 (11), 7 pages.
Darouiche R.O., et al., "Bacterial interference for Prevention of Urinary Tract Infection: a Prospective, Randomized, Placebo-controlled, Double-blind Pilot Trial," Clinical Infectious Diseases : An Official Publication of the Infectious Diseases Society of America, Nov. 2005, vol. 41 (10), 4 pages.
De Keersmaecker S.C., et al., "Strong Antimicrobial Activity of *Lactobacillus Rhamnosus* GG Against *Salmonella Typhimurium* is due to Accumulation of Lactic Acid," Federation of European Microbiological Societies Microbiology Letters, Jun. 2006, vol. 259(1). 8 pages.
Decision to Grant a Patent for Invention issued for Russian application No. 2013148474 filed May 9, 2012 dated May 19, 2017, 11 pages. (English Translation and Russian Original).
Decision to Grant dated May 31, 2017 for Russian Patent Application No. 2013148476/15 filed May 9, 2012 on behalf of Probiotical S.P.A, 15 pages. (Russian Original + 2 pages of English Translation).

Del Piano M., et al., "Correlation Between Chronic Treatment with Proton Pump Inhibitors (PPIs) and Bacterial Overgrowth in the Stomach: Any Possible Beneficial Role for Selected Lactobacilli?," Journal of clinical gastroenterology, Nov. 2014, vol. 48 Suppl 1, 7 pages.
Del Piano M., et al., "Evaluation of the Intestinal Colonization by Microencapsulated Probiotic Bacteria in Comparison With Same Uncoated Strains," Journal of clinical gastroenterology, Sep. 2010, vol. 44 Suppl 1, 5 pages.
Del Piano M., et al., "Is Microencapsulation the Future of Probiotic Preparations? The Increased Efficacy of Gastro-protected Probiotics," Gut Microbes, Mar. 2011, vol. 2 (2), pp. 4 pages.
DeNol, retrieved on Mar. 29, 2016, from the Internet: URL: www.risnet.ru/tn_index_id_6426.html, 2009, 5 pages.
Douillard F.P., et al., "Comparative Genomic and Functional Analysis of 100 *Lactobacillus Rhamnosus* Strains and their Comparison with Strain GG," PLOS Genetics, Aug. 2013, vol. 9 (8), 15 pages.
Dr. Jose Ma Sune Negre, "New Galenic Formulations to Forms of Administration" (English translation of "Nuevas Aportaciones Galenicas a las Formas de Administracion". En: Curos de formacion continuada para farmaceuticos de hospital. Fundacion Promocion Medica. Barcelona, 2002, 3, pp. 27-65), 3.2., Spanish with English Abstract, 27 pages.
Eaton K.A., et al., "Probiotic *Lactobacillus Reuteri* Ameliorates Disease Due to Enterohemorrhagic *Escherichia Coli* in Germfree Mice," Infection and Immunity, Jan. 2011, vol. 79 (1), 9 pages.
European Commission- Health & Consumer Protection Directorate-General. "Opinion of the Scientific Committee on Animal Nutrition on the Criteria for Assessing the Safety of Micro- Organisms Resistant to Antibiotics of Human Clinical and Veterinary Importance," 2002, pp. 1-20.
European Patent Office Communication pursuant to Article 94(3) EPC in relation to Application No. 12780278.3 dated Jun. 12, 2015, 4 pages.
Examination Report dated Apr. 28, 2014 for NewZealand IP No. 614002 filed Aug. 6, 2013 in the name of Probiotical S.P.A., 2 pages.
FAO/WHO, Guidelines for the Evaluation of Probiotics in Food, Apr. 30, 2002, 11 pages.
Federici F., et al., "Characterization and HeterologousExpression of the Oxalyl Coenzyme a Decarboxylase Gene from *Bifidobacterium lactis*," Applied and EnvironmentalMicrobiology, Sep. 2004, vol. 70 (9), 8 pages.
Fernandez M.F., et al,, "Probiotic Properties of Human Lactobacilli Strains to be used in the Gastrointestinal Tract," Journal of Applied Microbiology, 2003, vol. 94 (3), 7 pages.
Final Office Action for U.S. Appl. No. 13/982,255 filed Nov. 12, 2013 on behalf of Giovanni Mogna, dated Sep. 17, 2015, 15 pages.
Final Office Action for U.S. Appl. No. 14/005,821 filed Nov. 6, 2013 on behalf of Giovanni Mogna dated Dec. 30, 2014. 30 pages.
Final Office Action for U.S. Appl. No. 14/113,211 filed Nov. 26, 2013 on behalf of Giovanni Mogna dated Nov. 22, 2016, 12 pages.
Final Office Action for U.S. Appl. No. 14/116,996 filed Dec. 18, 2013 on behalf of Giovanni Mogna dated Dec. 14, 2017. 18 pages.
Final Office Action for U.S. Appl. No. 14/116,996 filed Dec. 18, 2013 on behalf of Giovanni Mogna dated Mar. 7, 2016. 22 pages.
Final Office Action for U.S. Appl. No. 14/116,999 filed Dec. 20, 2013 on behalf of Giovanni Mogna dated Dec. 9, 2016. 28 pages.
Final Office Action for U.S. Appl. No. 14/117,003 filed Dec. 27, 2013 on behalf of Giovanni Mogna dated Jun. 2, 2016. 11 pages.
Final Office Action for U.S. Appl. No, 14/344,021 filed May 9, 2014 on behalf of Giovanni Mogna dated Jan. 31, 2017. 19 pages.
Final Office Action for U.S. Appl. No, 14/344,047 filed Jul. 28, 2014 on behalf of Giovanni Mogna dated Aug. 4, 2017. 29 pages.
Final Office Action for U.S. Appl. No. 14/346,941 filed Mar. 24, 2014 on behalf of Probiotical North America Inc. dated Jan. 22, 2018. 14 pages.
Final Office Action for U.S. Appl. No. 14/891,306 filed Nov. 13, 2015 on behalf of Probiotical S.P.A. dated Jan. 18, 2018. 41 pages.
Final Office Action for U.S. Appl. No. 14/891,321 filed Nov. 13, 2015 on behalf of Probiotical S.P.A. dated Apr. 25, 2018. 8 pages.
Final Office Action for U.S. Appl. No. 15/265,706 filed Sep. 14, 2016 on behalf of Probiotical S.P.A. dated Feb. 2, 2018. 34 pages.

(56) References Cited

OTHER PUBLICATIONS

First Examination Report dated Mar. 9, 2016 for Chilean application No. 2013002148 filed Jul. 26, 2013, 21 pages.
Germond J.E., et al., "Evolution of the Bacterial Species *Lactobacillus Delbweckii*: a Partial Genomic Study with Reflections on Prokaryotic Concept," Molecular Biology and Evolution, Jan. 2003, vol. 20 (1), 12 pages.
Gotteland M., et al., "Systematic Review: Are Probiotics Useful in Controlling Gastric Colonization by Helicobacter Pylori?," Alimentary Pharmacology & Therapeutics, Apr. 2006, vol. 23 (8), 10 pages.
Grill J.P., et al., "Bile Salt Toxicity to Some Bifidobacteria Strains: Role of Conjugated Bile Salt Hydrolase and pH," Canadian Journal of Microbiology, Oct. 2000, vol. 46 (10), 7 pages.
Grimoud J., et al., "In Vitro Screening of Probiotic Lactic Acid Bacteria and Prebiotic Glucooligosaccharides to Select Effective Synbiotics," Anaerobe, Oct. 2010, vol. 16 (5), 8 pages.
Guardamagna O., et al., "Bifidobacteria Supplementation: Effects on Plasma Lipid Profiles in Dyslipidemic Children," Nutrition, Jul.-Aug. 2014, vol. 30 (7-8), 6 pages.
Gueimonde M., "Adhesion and Competitive Inhibition and Displacement of Human Enteropathogens by Selected Lactobacilli," Food Research International, May 2006, vol. 39 (4), 5 pages.
Guo X., "Basics and Application of Probiotics," Science and Technology Press, 1st Version, Oct. 2002, 4 pages. (Chinese Original and English Translation).
Guonong et al., China; Light Industry Press, 1st Edition in 2009, pp. 363, Publication Date: Aug. 31, 2009, 2 pages. (Chinese original+ English excerpt).
Gurbuz A.K., et al., "Effect of N-Acetyl Cysteine on Helicobacter Pylori," Souther Medical Journal, Nov. 2005, vol. 98 (11), 4 pages.
Hamilton-Miller J.M., et al,, "The Role of Probiotics in the Treatment and Prevention of Helicobacter Pylori Infection," International Journal of Antimicrobial Agents, Oct. 2003, vol. 22 (4), 7 pages.
Hemert S.V., et al., "Influence of the Multispecies Probiotic Ecologic®Barrier on Parameters of Intestinal Barrier Function," Food and Nutrition Sciences, Sep. 2014, vol. 5 (18), 8 pages.
Hoesl C.E., et al., "The Probiotic Approach: An Alternative Treatment Option in Urology," European Urology, Mar. 2005, vol. 47 (3), 9 pages.
Hutt P., et al., "Antagonistic Activity of Probiotic Lactobacilli and Bifidobacteria Against Entero- and Uropathogens," Journal of Applied Microbiology, Jun. 2006, vol. 100 (6), 9 pages.
Huynh H.Q., et al., "N-acetyicysteine, A Novel Treatment for Heiicobacter Pylori Infection," Digestive Diseases and Sciences, Nov.-Dec. 2004, vol. 49 (11-12), 9 pages.
Infante Pina D., et al., "Prevalence and Dietetic Management of Mild Gastrointestinal Disorders in Milk-fed Infants," World Journal of Gastroenterology, Jan. 2008, vol. 14 (2), 7 pages.
International Preliminary Report on Patentability for International Application No. PCT/IB2011/000561 filed Mar. 17, 2011 on behalf of Probiotical S.P.A. dated Sep. 17, 2013. 6 pages.
International Preliminary Report on Patentability for International Application No. PCT/IB2012/000095 filed Jan. 24, 2012 on behalf of Probiotical S.P.A. dated Jul. 30, 2013. 8 pages.
International Preliminary Report on Patentability for International Application No. PCT/IB2012/000895 filed May 9, 2012 on behalf of Probiotical S.P.A. dated Nov. 12, 2012. 7 pages.
International Preliminary Report on Patentability for International Application No. PCT/IB2012/000897 filed May 9, 2012 on behalf of Probiotical S.P.A. dated Nov. 12, 2013. 6 pages.
International Preliminary Report on Patentability for International Application No. PCT/IB2012/000907 filed May 9, 2012 on behalf of Probiotical S.P.A. dated Nov. 12, 2013. 6 pages.
International Preliminary Report on Patentability for International Application No. PCT/IB2012/001745 filed Sep. 10, 2012 on behalf of Probiotical North America Inc. dated Mar. 12, 2014. 8 pages.
International Preliminary Report on Patentability for International Application No. PCT/IB2014/000739 filed May 14, 2014 on behalf of Probiotical S.P.A. dated Nov. 26, 2015. 14 pages.
International Search Report for Application No. PCT/IB2012/000897 filed May 9, 2012 on behalf of Probiotical S.P.A. dated Aug. 24, 2012. 4 pages.
International Search Report for International Application No. PCT/IB2011/000561 filed Mar. 17, 2011 on behalf of Probiotical S.P.A. dated Dec. 16, 2011. 4 pages.
International Search Report for International Application No. PCT/IB2012/000095 filed Jan. 24, 2012 on behalf of Probiotical S.P.A. dated Mar. 29, 2012. 4 pages.
International Search Report for International Application No. PCT/IB2012/000779 filed Apr. 18, 2012 on behalf of Giovanni Mogna. dated Jul. 19, 2012. 3 pages.
International Search Report for International Application No, PCT/IB2012/000895 filed Sep. 9, 2012 on behalf of Probiotical S.P.A. dated Sep. 21, 2012. 5 pages.
International Search Report for International Application No. PCT/IB2012/000907 filed May 9, 2012 on behalf of Probiotical S.P.A. dated Sep. 27, 2012. 4 pages.
International Search Report for International Application No. PCT/IB2012/001741 filed Sep. 10, 2012 on behalf of Giovanni Mogna. dated Dec. 3, 2012. 4 pages.
International Search Report for International Application No. PCT/IB2012/001745 filed Sep. 10, 2012 on behalf of Probiotical S.P.A. dated Dec. 17, 2012. 6 pages.
International Search Report for International Application No. PCT/IB2014/000731 filed May 14, 2014 on behalf of Probiotical S.P.A. dated Jul. 25, 2014. 7 pages.
International Search Report for International Application No. PCT/IB2014/000739 filed May 14, 2014 on behalf of Probiotical S.P.A. dated Jul. 31, 2014. 8 pages.
Italian Search Report and Written Opinion for MI20110792. dated Nov. 11, 2011. 9 pages.
Japanese Patent Office Official Action for Japanese Patent Application No. 2013550962. dated Dec. 1, 2015. 10 pages. (Japanese original+ English translation).
Japanese Patent Office Official Action for Japanese Patent Application No. 2013558517. dated Mar. 3, 2015. 4 pages. (Japanese original+ English translation).
Japanese Patent Office Official Action for Japanese Patent Application No. 2014509849. dated Apr. 26, 2016. 9 pages. (Japanese original + English translation).
Japanese Patent Office Official Action for Japanese Patent Application No. 2014529081. dated May 31, 2016. 8 pages. (Japanese original+ English translation).
Japanese Patent Office Official Action Summary for Japanese Patent Application No, 2014509850 filed on behalf of Probiotical S.P.A. dated Feb. 16, 2016. 5 pages. (Japanese original + English translation).
Johnson-Henry K.C., et al., "*Lactobacillus Rhamnosus* Strain GG Prevents Enterohemorrhagic *Escherichia coli* O157:H7-Induced Changes in Epithelial Barrier Function," Infection and Immunity, Apr. 2008, vol. 76 (4), 9 pages.
Kanamor Y., et al., "Parenteral and Enteral Nutrition," 2010, vol. 25 (4), 1 pages.
Karamanolis G., et al., "A Glass of Water Immediately Increases Gastric pH in Healthy Subjects," Digestive Diseases and Sciences, Dec. 2008, vol. 53 (12), 5 pages.
Khavkin A.I., et al., "Modern Principles of Ulcer Disease," retrieved on Mar. 29, 2016, from the Internet: URL: www.Ivrach.ru/2005/0214532114/, 6 pages. (Russian original+ English translation of relevant parts).
Kim H.S., et al., "In vitro Antioxidative Properties of Lactobacilli," Asian-Australasian Journal of Animal Sciences, 2006, vol. 19 (2), 5 pages.
Kim J.W, et al., "Antimicrobial Effect of *Bifidobacterium Breve* and *Bifidobacterium Infantis* against *Salmonella Typhimurium* KCTC 1925 and *E.coli* O157:H7 ATCC 43895," Korean Society of Food Science and Technology, Jan. 2002, vol. 11 (1), 4 pages.
Kizerwetter-Swida M., et al., "Selection of Potentially Probiotic *Lactobacillus* Strains Towards Their Inhibitory Activity Against Poultry Enteropathogenic Bacteria," Polish Journal of Microbiology, 2005, vol. 54 (4), 8 pages.

(56) References Cited

OTHER PUBLICATIONS

Klaver F.A.M., et al., "The Assumed Assimilation of Cholesterol by Lactobacilli and *Bifidobacterium Bifidum* Is Due to Their Bile Salt-Deconjugating Activity," Applied and Environmental Microbiology, Apr. 1993, vol. 59 (4), 5 pages.

Krosnynk Li., et al., "Pharmaceutical Technology: Technology of Dosage Forms: A Textbook for University Students," Academia Editorial Center, 2006, 3 pages. (Russian Original+ English Translation of Relevant Parts).

Lieske J.C., et al., "Use of a Probiotic to Decrease Enteric Hyperoxaluria," Kidney International, Sep. 2005, vol. 68 (3), 6 pages.

Likotrafiti E., et al., "Molecular Identification and Anti-pathogenic Activities of Putative Probiotic Bacteria Isolated from Faeces of Healthy Elderly individuals," Microbial Ecology in Health and Disease, 2004, vol. 16 (2-3), 8 pages.

Lin M.Y., et al., "Antioxidative Effect of intestinal Bacteria *Bifidobacterium Longum* ATCC 15708 and *Lactobacillus Acidophilus* ATCC 4356," Digestive Diseases and Sciences, Aug. 2000, vol. 45 (8), 6 pages.

Lin M.Y., et al., "Inhibition of Lipid Peroxidation by *Lactobacillus Acidophilus* and *Bifidobacterium Longum*," Journal of Agricultural and Food Chemistry, Sep. 1999, vol. 47 (9), 4 pages.

Liu J.R., et al., "Antioxidative Activities of Kefir," Asian-Australasian Journal of Anirnai Sciences, 2005, vol. 18 (4), 8 pages.

Losada M.A., et al., "Towards a Healthier Diet for the Colon: The influence of Fructooligosaccharides and Lactobacilli on intestinal Health," Nutrition Research, Jan. 2002, vol. 22 (1-2), 14 pages.

Lu H., et al., "New Development in the Mechanistic Understanding of Peptic Ulcer Diseases," Drug Discovery Today: Disease Mechanisms, Dec. 2006, vol. 3 (4), 7 pages.

Lutgendorff F., et al., "Probiotics Enhance Pancreatic Glutathione Biosynthesis and Reduce Oxidative Stress in Experimental Acute Pancreatitis," American Journal of Physiology. Gastrointestinal and Liver Physiology, Nov. 2008, vol. 295 (5), 11 pages.

Macfarlane S., et al., "Review Article: Prebiotics in the Gastrointestinal Tract," Alimentary Pharmacology & Therapeutics, Sep. 2006, vol. 24 (5), 14 pages.

Malecka M., "Antioxidant Properties of the Unsaponifiabie Matter isolated From Tomato Seeds, Oat Grains and Wheat Germ Oil," Food Chemistry, Nov. 2002, vol. 79 (3), 4 pages.

Marchese A., et al., "Effect of Fosfomycin Alone and in Combination with N-Acetylcysteine on *E. Coli* Biofilms," International Journal of Antimicrobial Agents, Oct. 2003, vol. 22 Suppl 2, 6 pages.

Masashi Okarnura, "Youkei no Tomo," 2008, vol. 558, 1 pages.

Mathews R.M., et al., "Sodium Bicarbonate as a Single Dose Antacid in Obstetric Anaesthesia," Anaesthesia, Jul. 1989, vol. 44 (7), 2 pages.

Mcfarland L.V., "Meta-analysis of Probiotics for the Prevention of Antibiotic Associated Diarrhea and the Treatment of Clostridium Difficile Disease," The American Journal of Gastroenterology, Apr. 2006, vol. 101 (4), 11 pages.

Mei X., et al., "Manual of New Drug and Special Drug," Technology Press, 2nd Version, Jan. 2001, 3 pages.

Milani C., et al., "Comparative Genomics of *Bifidobacterium Animalis* Subsp. *Lactis* Reveals a Strict Monophyletic Bifidobacterial Taxon. ," Applied and Environmental Microbiology, Jul. 2013, vol. 79 (14), 12 pages.

Modesto M., et al., "Resistance to Freezing and Freeze-drying Storage Processes of Potential Probiotic Bifidobacteria," Annals of Microbiology, Jan. 2004, vol. 54 (1), 6 pages.

Moen S.T., et al., "Testing the Efficacy and Toxicity of Adenylyl Cyclase inhibitors Against Enteric Pathogens Using in Vitro and in Vivo Models of Infection," Infection and Immunity, Apr. 2010, vol. 78 (4), 10 pages.

Mogna L., et al., "Assessment of the in Vitro inhibitory Activity of Specific Probiotic Bacteria Against Different *Escherichia Coli* Strains," Journal of Clinical Gastroenterology, Oct. 2012, vol. 46 (Supp 1), 4 pages.

Mogna, L., et al., "Screening of Different Probiotic Strains for Their in Vitro Ability to Metabolise Oxalates: Any Prospective Use in Humans?" Journal of Clinical Gastroenterology, 2014, vol. 48, S91-S95). 5 pages.

Mogna L., et al., "In Vitro Inhibition of *Klebsiella Pneumoniae* by *Lactobacillus Delbrueckii* Subsp. *Delbrueckii* LDD01 (DSM 22106): An Innovative Strategy to Possibly Counteract Such infections in Humans?," Journal of Clinical Gastroenterology, Nov.-Dec. 2016, vol. 50 (Supp 2), 4 pages.

Non-Final Office Action for U.S. Appl. No. 13/982,255 filed Nov. 12, 2013 on behalf of Giovanni Mogna. dated Mar. 10. 2015. 19 pages.

Non-Final Office Action for U.S. Appl. No. 14/005,821 filed Nov. 6, 2013 on behalf of Giovanni Mogna. dated Jun. 5, 2014. 36 pages.

Non-Final Office Action for U.S. Appl. No. 14/113,211 filed Nov. 26, 2013 on behalf of Giovanni Mogna. dated Dec. 7, 2017. 36 pages.

Non-Final Office Action for U.S. Appl. No. 14/113,211 filed Nov. 26, 2013 on behalf of Giovanni Mogna. dated Jan. 22, 2016. 13 pages.

Non-Final Office Action for U.S. Appl. No. 14/113,211 filed Nov. 26, 2013 on behalf of Giovanni Mogna. dated Apr. 22, 2015. 13 pages.

Non-Final Office Action for U.S. Appl. No. 14/116,996 filed Dec. 18, 2013 on behalf of Giovanni Mogna. dated May 21, 2015. 29 pages.

Non-Final Office Action for U.S. Appl. No. 14/116,996 filed Dec. 18, 2013 on behalf of Giovanni Mogna. dated Mar. 27, 2017. 20 pages.

Non-Final Office Action for U.S. Appl. No. 14/116,999 filed Dec. 20, 2013 on behalf of Giovanni Mogna. dated Jun. 16, 2015. 28 pages.

Non-Final Office Action for U.S. Application No. 14/116,999 filed Dec. 20, 2013 on behalf of Giovanni Mogna. dated Mar. 14, 2016. 25 pages.

Non-Final Office Action for U.S. Appl. No. 14/116,999 filed Dec. 20, 2013 on behalf of Giovanni Mogna, dated Jan. 5, 2018. 26 pages.

Non-Final Office Action for U.S. Appl. No. 14/117,003 filed Dec. 27, 2013 on behalf of Giovanni Mogna, dated Oct. 14, 2015. 18 pages.

Non-Final Office Action for U.S. Appl. No. 14/344,021 filed May 9, 2014 on behalf of Giovanni Mogna. dated Apr. 18, 2016, 29 pages.

Non-Final Office Action for U.S. Appl. No. 14/344,021 filed May 9, 2014 on behalf of Giovanni Mogna. dated Jul. 24, 2017. 18 pages.

Non-Final Office Action for U.S. Appl. No. 14/344,047 filed Jul. 28, 2014 on behalf of Giovanni Mogna, dated Oct. 13, 2016. 27 pages.

Non-Final Office Action for U.S. Appl. No. 14/346,941 filed Mar. 24, 2014 on behalf of Probiotical North America Inc. dated Apr. 19, 2017. 14 pages.

Non-Final Office Action for U.S. Appl. No. 14/891,306 filed Nov. 13, 2015 on behalf of Probiotical S.P.A. dated Nov. 22, 2016. 37 pages.

Non-Final Office Action for U.S. Appl. No. 14/891,321 filed Nov. 13, 2015 on behalf of Probiotical S.P.A. dated Sep. 6, 2017. 14 pages.

Non-Final Office Action for U.S. Appl. No. 15/265,706 filed Sep. 14, 2016 on behalf of Probiotical S.P.A. dated Jul. 11, 2017. 14 pages.

Notice of Allowance for U.S. Appl. No. 13/982,255 filed Nov. 12, 2013 on behalf of Giovanni Mogna. dated Jan. 22, 2016. 10 pages.

Notice of Allowance for U.S. Appl. No. 13/982,255 filed Nov. 12, 2013 on behalf of Giovanni Mogna. dated Jun. 15, 2016. 11 pages.

Notice of Allowance for U.S. Appl. No. 13/982,255 filed Nov. 12, 2013 on behalf of Giovanni Mogna. dated Jul. 27, 2016. 9 pages.

Notice of Allowance for U.S. Appl. No. 14/117,003 filed Dec. 27, 2013 on behalf of Giovanni Mogna. dated Nov. 9, 2016. 7 pages.

Notice of Allowance for U.S. Appl. No. 14/117,003 filed Dec. 27, 2013 on behalf of Giovanni Mogna. dated Jul. 6, 2017. 10 pages.

Notice of Allowance for U.S. Appl. No. 14/117,003 filed Dec. 27, 2013 on behalf of Giovanni Mogna. dated Nov. 22, 2016, 8 pages.

Notice of Allowance for U.S. Appl. No. 14/344,021 filed May 9, 2014 on behalf of Giovanni Mogna, dated Mar. 27, 2018. 9 pages.

(56) References Cited

OTHER PUBLICATIONS

Notice of Allowance for U.S. Appl. No. 14/344,021 filed May 9, 2014 on behalf of Giovanni Mogna, dated Dec. 15, 2017. 7 pages.
Notification of the Second Office Action for Chinese Patent Application No. 201280034204.6 filed on behalf of Probiotical S.P.A. dated Oct. 21, 2016, 17 pages (Chinese Original + English translation).
Office Action for Japanese Patent Application No. JP2016513455. dated Jan. 16, 2018, 7 pages (English Translation+ Japanese Original).
Office Action for KZ Application No. 20131615.1 filed Jan. 24, 2012 by Tagbergenova Alma Taishevna et al., dated Jul. 15, 2014, 5 pages, (Russian Original+ English Translation).
Office Action for Russian Patent Application No. 2013137656/15 filed Jan. 24, 2012 on behalf of Probiotical S.P.A. dated Mar. 18, 2016. 10 pages (Russian original + English translation).
Office Action for Russian Patent Application No. 2014107771/10 filed on behalf of Probiotical S.P.A. dated Jun. 2, 2016. 8 pages (Russian original+ English translation).
Office Action Inquiry for Russian Patent Application No. 2013144267 filed Mar. 17, 2011 on behalf of Probiotical S.P.A. dated Mar. 12, 2015. 5 pages (English Translation).
Office Action dated Feb. 13, 2017 for Chinese Patent Application No. 201280022854.9 filed May 9, 2012 in the name of Probiotical S.P.A., 12 pages (English+ Chinese).
Office Action dated Feb. 15, 2016 for Chinese Patent Application No. 201180070870.0, 15 pages (Chinese original+ English translation).
Office Action dated Mar. 25, 2016 for Chinese Patent Application No. 201230015994.3, 23 pages (Chinese original+ English translation).
Office Action dated Nov. 4, 2014 for Chinese Patent Application No. 201230022354.9 filed May 9, 2012 in the name of Probiotical S.P.A. (English + Chinese), 15 pages.
Official Action for Russian Patent Application No. 2013151611 filed Apr. 18, 2012 on behalf of Giovanni Mogna, 12 pages (Russian original + English translation).
Okombo J., et al., "Probiotic-Induced Reduction of Gastrointestinal Oxalate Absorption in Healthy Subjects," Urological Research, Jun. 2010, vol. 38 (3), 10 pages.
Opposition to Ecuadorian Patent Application SP201313082 on behalf of Alafar, 2015, 14 pages (Spanish original + English translation).
Ouoba L.I., et al., "Resistance of Potential Probiotic Lactic Acid Bacteria and Bifidobacteria of African and European Origin to Antimicrobials: Determination and Transferability of the Resistance Genes to Other Bacteria," International Journal of Food Microbiology, Jan. 2008, vol. 121 (2), 8 pages.
Ouwehand A.C., et al., "Probiotics: An Overview of Beneficial Effects," Antonie Van Leeuwenhoek, Aug. 2002, vol. 82 (1-4), 11 pages.
Pascual L., et al., "Vaginal Colonization and Activity of the Pro biotic Bacterium Lactobacillus Fermentum L23 in a Murine Model of Vaginal Tract Infection," Journal of Medical Microbiology, 2010, vol. 59 (Pt 3), 5 pages.
Peran L., et al,, "A Comparative Study of the Preventative Effects Exerted by Three Probiotics, *Bifidobacterium Lactis*, *Lactobacillus Casei* and *Lactobacillus Acidophilus*, in the TNBS Model of Rat Colitis," Journal of Applied Microbiology, Oct. 2007, vol. 103 (4), 9 pages.
Puccio G., et al., "Clinical Evaluation of a New Starter Formula for Infants Containing Live *Bifidobacterium Longum* BL999 and Prebiotics," Nutrition, Jan. 2007, vol. 23 (1), 8 pages.
Qingbin et al., Science Press, 1st Edition, Jun. 2012 , 7 pages (Chinese Original + English Excerpt).
Rada V., et al,, "Susceptibility of Bifidobacteria to Lysozyme as a Possible Selection Criterion for Probiotic Bifidobacterial Strains," Biotechnology Letters, Mar. 2010, vol. 32 (3), 5 pages.
Rada V., et al., "Susceptibility of Bifidobacteria to Nisin," Letters in Applied Microbiology, Feb. 1998, vol. 26 (2), 3 pages.

Restriction Requirement for U.S. Appl. No. 13/982,255 filed Nov. 12, 2013 on behalf of Giovanni Mogna. dated Oct. 17, 2014. 6 pages.
Restriction Requirement for U.S. Appl. No. 14/005,821 filed Nov. 6, 2013 on behalf of Giovanni Mogna. dated Jan. 7, 2014. 7 pages.
Restriction Requirement for U.S. Appl. No. 14/113,211 filed Nov. 26, 2013 on behalf of Giovanni Mogna. dated Sep. 5, 2014. 9 pages.
Restriction Requirement for U.S. Appl. No. 14/116,996 filed Dec. 18, 2013 on behalf of Giovanni Mogna, dated Feb. 4, 2015, 11 pages.
Restriction Requirement for U.S. Appl. No. 14/116,999 filed Dec. 20, 2013 on behalf of Giovanni Mogna, dated Mar. 11, 2015. 12 pages.
Restriction Requirement for U.S. Appl. No. 14/117,003 filed Dec. 27, 2013 on behalf of Giovanni Mogna, dated Feb. 20, 2015. 9 pages.
Restriction Requirement for U.S. Appl. No. 14/344,021 filed May 9, 2014 on behalf of Giovanni Mogna, dated Aug. 14, 2015. 7 pages.
Restriction Requirement for U.S. Appl. No. 14/344,047 filed Jul. 28, 2014 on behalf of Giovanni Mogna, dated Feb. 19, 2016. 8 pages.
Restriction Requirement for U.S. Appl. No. 14/346,941 filed Mar. 24, 2014 on behalf of Probiotical North America Inc. dated Nov. 16, 2016. 8 pages.
Restriction Requirement for U.S. Appl. No. 14/891,306 filed Nov. 13, 2015 on behalf of Probiotical S.P.A. dated Apr. 13, 2016. 7 pages.
Restriction Requirement for U.S. Application No. 14/891,321 filed Nov. 13, 2015 on behalf of Probiotical S.P.A. dated Jun. 16, 2017, 6 pages.
Ritchie J.M., "Animal Models of Enterohernorrhagic *Escherichia coli* Infection," Microbiology Spectrum, Aug. 15, 2014, vol. 2(4), 13 pages, EHEC-0022-2013.
Rönnqvist D., et al., "*Lactobacillus Fermentum* Ess-1 with Unique Growth Inhibition of Vulvo-Vaginal Candidiasis Pathogens," Journal of Medical Microbiology, Nov. 2007, vol. 56(Pt 11), 5 pages.
Sachet, Webpage from Merriam-Webster.Com, Oct. 7, 2011, accessed via WayBackMachine.com, 1 page.
Saggioro A., "Probiotics in the Treatment of Irritable Bowel Syndrome," Journal of Clinical Gastroenterology, Jul. 2004, vol. 38(6 Suppl), 4 pages.
Santini C., et al., "Characterization of Probiotic Strains: an Application as Feed Additives in Poultry Against Campylobacter Jejuni," International Journal of Food Microbiology, Jul. 2010, vol. 141 (Suppl 1), 1 pages.
Scardovi V., et al., "Multiple Electrophoretic Forms of Transaldolase and 6-Phosphogluconic Dehydrogenase and Their Relationships to the Taxonomy and Ecology of the Bifidobacteria," International Journal of Systematic and Evolutionary Microbiology, Original Papers Relating to Systematic Bacteriology, vol. 29 (4), Oct. 1979, 16 pages.
Sgouras D.N., et al., "*Lactobacillus johnsonii* La1 Attenuates Helicobacter Pylori-associated Gastritis and Reduces Levels of Proinflammatory Chemokines in C57bl/6 Mice," Clinical and Diagnostic Laboratory Immunology, Edited by U. Gallo, L. Santamaria., Dec. 2005, vol. 12 (12), 10 pages.
Shigeru Kamiya, "Igaku No Ayumi," Journal of Clinical and Experimental Medicine, 2003, vol. 207 (10), 7 pages.
Shim Y.H., et al., "Antimicrobial Activity of Lactobacillus Strains Against Uropathogens," Pediatrics International, Oct. 2016, vol. 58 (10), 5 pages.
Shu Q., et al., "Immune Protection Mediated by the Probiotic *Lactobacillus Rhamnosus* HN001 (DR20) Against *Escherichia Coli* O157:H7 Infection in Mice," FEMS Immunology and Medical Microbiology, Sep. 2002, vol. 34 (1), 6 pages.
Strus M., et al., "Studies on the Effects of ProBiotic Lactobacillus Mixture Given Orally on Vaginal and Rectal Colonization and on Parameters of Vaginal Health in Women with Intermediate Vaginal Flora," Europoean Journal of Obstetrics Gynecology and Reproductive Biology, Aug. 2012, vol. 163 (2), 6 pages.
Terris M.K., et al., "Dietary Supplementation with Cranberry Concentrate Tablets May Increase the Risk of Nephrolithiasis," Urology, Jan. 2001, vol. 57 (1), 4 pages.

(56) References Cited

OTHER PUBLICATIONS

The EFSA Journal, "Opinion of the Scientific Panel on Additives and Products or Substances used in Animal Feed on the updating of the criteria used in the assessment of bacteria for resistance to antibiotics of human and veterinary importance," 2005, 223, 12 pages.
Third Office Action for Chinese Patent Application No. 201280022854.9, dated May 17, 2016. 12 pages. (Chinese original + English translation).
Torriani S., et al., "Differentiation of *Lactobacillus Plantarum, L. Pentosus*, and *L. Paraplantarum* by recA Gene Sequence Analysis and Multiplex PCR Assay with recA gene-Derived Primers," Applied and Environmental Microbiology, Aug. 2001, vol. 67(8), 6 pages.
Tsai C.C., et al., "Three *Lactobacillus* Strains From Healthy Infant Stool Inhibit Enterotoxigenic *Escherichia Coli* Grown in Vitro," Anaerobe, Apr. 2008, vol. 14 (2), 7 pages.
Turroni S., et al., "Oxalate Consumption by Lactobacilli: Evaluation of Oxalyl-CoA Decarboxylase and Formyl-CoA Transferase Activity in *Lactobacillus Acidophilus*," Journal of Applied Microbiology, Nov. 2007, vol. 103 (5), 10 pages.
Vasiljevic T., et al., "Probiotics-From Metchnikoff to bioactives," International Dairy Journal, Jul. 2008, vol. 18 (7), 15 pages.
Ventura M. et al., "Identification and Tracing of *Bifidobacterium* Species by Use of Enterobacterial Repetitive Intergenic Consensus Sequences," Applied and Environmental Microbiology, vol. 69 (7), Jul. 2003, 6 pages.
Vicariotto F. "Effectiveness of an Association of a Cranberry Dry Extract, D-Mannose, and the two Microorganisms *Lactobacillus Plantarum* LP01 and *Lactobacillus Paracasei* LPC09 in Women Affected by Cystitis: A Pilot Study," Clinical Gastroenterology, Nov.-Dec. 2014, vol. 48 Suppl 1, 6 pages.
Vicariotto F et al., "65: Effectiveness of an Association of a Cranberry Dried Extract, D-Mannose arid the Three Microorganisms *L. Plantarum* LP01, *L. Paracasei*, LFC09 and S.Thermophilus ST10 in Women Affected by Cystitis: A Pilot Study," 7th Probiotics & Prebiotics New Foods, Jul. 2013, 52 pages.
Walter J., et al., "Detection and Identification of Gastrointestinal *Lactobacillus* Species by Using Denaturing Gradient Gel Electrophoresis and Species-Specific PCR Primers," Applied and Environmental Microbiology, Jan. 2000, vol. 66 (1), 8 pages.
Wang K.Y., et al,, "Effects of ingesting *Lactobacillus*-and *Bifidobacterium*-Containing Yogurt in Subjects With Colonized Helicobacter Pylori," American Journal of Clinical Nutrition, Sep. 2004, vol. 80 (3), 5 pages.
Wikipedia "Colony-Forming Unit", Downloaded from the Internet Apr. 13, 2017. http://en.wikipedia.org/wiki/Colony-forming unit, 1 page.
Wikipedia "Pharmaceutical Drug" Updated Apr. 15, 2016. Downloaded from the internet Apr. 21, 2016. 11 pages.
Wikipedia, "Strain (biology)" https://en.wikipedia.org/wiki/Strain_(biology) Retrieved on Nov. 3, 2015., 2 pages.
Wiktionary "Bifidogenic" Last modified Jul. 19, 2014, Retrieved from the internet on Apr. 13, 2017, from http://en.wiktionary.org/wiki/bifidogenic, 1 page.
Wiktionary "Cluster-definition" retrieved from the internet on Apr. 27, 2017 from http://web.archive.org/web/20100214060846/https://en.wiktionary.org/wiki/cluster, 4 pages.
Written Opinion for Application No. PCT/IB2011/000561 filed Mar. 17, 2011 on behalf of Probiotical S.P.A. dated Dec. 16, 2011. 5 pages.
Written Opinion for Application No. PCT/IB2012/000095 filed Jan. 24, 2012 on behalf of Probiotical S.P.A. dated Mar. 29, 2012. 8 pages.
Written Opinion for Application No. PCT/IB2012/000779 filed Apr. 18, 2012 on behalf of Giovanni Mogna. dated Jul. 19, 2012. 5 pages.
Written Opinion for Application No. PCT/IB2012/000895 filed May 9, 2012 on behalf of Probiotical S.P.A. dated Sep. 21, 2012, 6 pages.
Written Opinion for Application No. PCT/IB2012/000897 filed May 9, 2012 on behalf of Probiotical S.P.A. dated Aug. 24, 2012. 5 pages.
Written Opinion for Application No. PCT/IB2012/000907 filed May 9, 2012 on behalf of Probiotical S.P.A. dated Sep. 27, 2012. 5 pages.
Written Opinion for Application No. PCT/IB2012/001741 filed Sep. 10, 2012 on behalf of Giovanni Mogna. dated Dec. 3, 2012. 9 pages.
Written Opinion for Application No. PCT/IB2012/001745 filed Sep. 10, 2012 on behalf of Probiotical S.P.A. dated Dec. 17, 2012. 7 pages.
Written Opinion for Application No. PCT/IB2014/000731 filed May 14, 2014 on behalf of Probiotical S.P.A. dated Jul. 25, 2014. 10 pages.
Written Opinion for Application No. PCT/IB2014/000739 filed May 14, 2014 on behalf of Probiotical S.P.A. dated Jul. 31, 2014. 11 pages.
Ying D.Y., et al., "Microencapsulated *Lactobacillus Rhamnosus* GG Powders: Relationship of Powder Physical Properties to Probiotic Survival During Storage," Journal of Food Science, Nov. 2010, vol. 75 (9), 8 pages.
Yoon Y., et al., "Occurrence of Glutathione Sulphydryl (GSH) and Antioxidant Activities in Probiotic *Lactobacillus* Spp," Asian-Australasian Journal of Animal Sciences, 2004, vol. 17 (11), 5 pages.
Zanoni S., et al., "Growth Kinetics on Oligo- and Polysaccharides and Promising Features of Three Antioxidative Potential Probiotic Strains," Applied Microbiology, Nov. 2008, vol. 105 (5), 11 pages.
Zarate et al., "Protective Effect of Vaginal *Lactobacillus Paracasei* CRL 1289 Against Urogenital infection Produced by *Staphylococcus Aureus* in a Mouse Animal Model," Infectious Diseases in Obstetrics and Gynecology, Mar. 2007, 6 pages.
Zhang L., et al., "Evaluation of *Lactobacillus Rhamnosus* GG Using an *Escherichia Coli* K88 Model of Piglet Diarrhoea: Effects on Diarrhoea incidence, Faecal Microflora and Immune Responses," Veterinary Microbiology, Feb. 2010, vol. 141 (1-2), 7 pages.

* cited by examiner

MATERIAL IMPERMEABLE TO HUMIDITY AND OXYGEN FOR PACKAGING DIETARY PRODUCTS, COSMETICS AND MEDICINAL SPECIALITIES

CROSS REFERENCE TO RELATED APPLICATIONS

The present application is the U.S. national stage of International Patent Application PCT/IB2012/001,848 filed on Sep. 21, 2012, which, in turn, claims priority to Italian Patent Application MI2011A001718 filed on Sep. 23, 2011.

The present invention refers to a material impermeable to humidity and oxygen for packaging dietary products, cosmetics and medicinal specialities. In particular, the present invention refers to primary packaging in the form of blister packs or sachets, which comes into direct contact with the formulations of dietary products, cosmetics and medicinal specialities, such as, for example, tablets, pills, pessaries, powders, granules, suppositories, rigid capsules and soft capsules (also known as soft gel capsules).

In the pharmaceutical, cosmetic and dietary supplements sectors, the importance of the primary packaging to ensure a suitable shelf life is known, useful for the purpose of the sale of finished products, such as, for example, dietary products, cosmetics and medicinal specialities.

Primary packaging means the material, for example blister packs and sachets, that comes into direct contact with the formulations of the medicinal specialities or dietary products.

The commonly used material for blister packs and sachets may consist of paper, and various types of plastic material often combined with each other and, sometimes, coupled to a sheet or layer of aluminium.

The most commonly used types include the so-called polyethylene/aluminum/polyethylene terephthalate—PE/AL/PET, which constitutes a multilayer packaging material with three layers.

In the event of formulations containing pharmacological active ingredients and/or components with unstable biological activity and/or easily degradable, especially if they come into contact with the external environment (humidity, water vapour, light and oxygen), the aforementioned materials are not suitable to guarantee sufficient stability with the consequent degradation of the active ingredient contained therein.

The most commonly used forms of administration in the packaging of dietary products, cosmetics and medicinal specialities include tablets, pills, pessaries, powders, granules, suppositories, rigid capsules and soft capsules (also known as soft gel capsules). Said forms are commonly packaged in the primary packaging types mentioned above.

Agents that come from the external environment (humidity, water vapour, light and oxygen) can modify some chemical/physical parameters of the formulations causing instability and loss of efficacy of the active components contained. Said agents have shown to be particularly decisive in accelerating the kinetics of oxidation, hydrolytic, photochemical and putrefaction reactions. In the event that the active ingredients consist of or comprise microorganisms, said external agents (humidity, water vapour, light and oxygen) can notably influence the microbial metabolism with the formation of toxic catabolites which lead to cell death. In the probiotics sector, microorganisms that can bring beneficial effects to the health of consumers if consumed in suitable quantities and times, the efficacy over the shelf life is compromised if the microbial metabolism is not sufficiently slowed down or reduced. A sufficiently slowed down or reduced microbial metabolism is obtained not only by guaranteeing at the time of manufacturing the probiotic product an extremely reduced degree of humidity and free water, but by preventing, over the shelf life of the product, an increase in humidity and oxygen. Therefore, during the shelf life, the entry of environmental humidity and/or oxygen from outside towards the inside of said product must be prevented.

There are products based on probiotic microorganisms in which the latter are mixed or supported by a lipophilic matrix, for example vegetable oil, or by a fat matrix, for example glycerine, which as well as suffering from the above-described problem must also be compared with some oxidation phenomena which take place in the matrix itself and that are accelerated by the entry of oxygen and/or the presence of metals and other oxidising substances. In lipophilic matrices oxidation leads to the formation of substances such as aldehydes, ketones, oxidised fatty acids (conjugated trienes C18:3, conjugate acids 9,11-10,12 c,t-t,c C18:2, conjugate acids 9,11-10,12 t,t-t,t C18:2) volatile organic compounds (such as C6:0 hexanal, C9:0 nonanal) which are highly toxic for the microorganisms suspended therein (intrinsic toxicity).

Therefore, in this type of products based on probiotic microorganisms, a technologist skilled in the art must check for the absence of humidity and intrinsic toxicity to the lipophilic matrix. Furthermore, increases in humidity and/or the formation of toxic compounds must be prevented, during the shelf life of the finished products, due to the oxidation phenomena that take place because of the entry of air/oxygen into the lipophilic matrix.

Therefore, to guarantee the efficacy of products based on probiotic microorganisms until the end of their shelf life, the need emerges, not only to verify the total biocompatibility of the various substances that compose the formulation (absence of toxic substances such as polyphenols, tocopherols, free phenolic acids, aromatic polycyclic hydrocarbons etc. contained in the lipophilic matrix and/or in the other substances contained in the composition), but also to use a material to make the primary packaging having a real barrier effect against humidity and oxygen.

Therefore, the need remains to be able to provide a material that can ensure a shelf life of at least 24 months for dietary products, cosmetics and medicinal specialities, in particular for products containing probiotic microorganisms that are in contact with a lipophilic matrix. Furthermore, the need remains to be able to provide a material for making primary packaging for bottles, vials, blister packs and sachets that is impermeable to water vapour and oxygen but, at the same time, has breakage characteristics such as to allow breaking with simple finger pressure on the cavity of the blister pack and cutting characteristics such as to allow the sachet to be opened with the fingers. Even more particularly, the need remains to be able to provide a blister pack that enables the packaging of soft capsules (soft gel capsules) containing a lipophilic matrix and microorganisms.

The Applicant has given a suitable response to the above-mentioned need by creating a new material for packaging medicinal specialities, dietary products and cosmetics comprising at least two layers of aluminium coupled to each other, said material having a final thickness such as to maintain the breakage and cutting characteristics necessary to enable practical and easy use.

In a preferred embodiment, the material of the present invention can be schematically illustrated as polyamide/multilayer material of aluminium/polyethylene [PA/(AL)$_n$/

PE] or polyamide/multilayer material of aluminium/polyvinyl chloride [PA/(AL)$_n$/PE], where n is comprised from 2 to 10, preferably from 2 to 5, even more preferably from 3 to 4.

Advantageously, the material of the present invention having at least two layers of aluminium (double layer) it guarantees a much lower permeability with respect to a same material having a single layer of aluminium (single layer), of the same final thickness as the double layer, especially with reference to water vapour and oxygen. The material with two layers of aluminium of the present invention has numerous advantages with respect to the same material with a single layer of aluminium, with the same final thickness.

The present invention refers to a material, a blister pack and a sachet which have the characteristics as shown in the appended claims.

Other preferred embodiments of the present invention are described in the following detailed description and such embodiments will be claimed in the appended dependent claims.

A blister pack is a term used for different types of pre-established plastic packages used as containers, for example, single-dose containers, for medicinal specialities, cosmetics and dietary products. The two main parts of the blister pack are the cavity obtained thanks to a sufficiently deformable material by temperature increase and a breakable aluminium cover. The cavity usually contains the medicinal speciality or the dietary or cosmetic product, whereas the cover can display the information on the contents or the manufacturer.

The permeability of polymeric materials is known for many materials. Table 1 shows, for some materials, the oxygen transmission rate OTR (cm$^3$m$^{-2}$d$^{-1}$atm-1 at 23° C., 50% RH) and the water vapour transmission rate WVTR (gm$^{-2}$d$^{-1}$ at 23° C., 75% RH) of composite films containing 12 μm of PET.

TABLE 1

| Material | OTR | WVTR | Composite μm |
|---|---|---|---|
| PET | 110 | 15 | 12 |
| PET/PE | 0.93-1.24 | 0.248-0.372 | 12/50 |
| PET/EVOH/PE | 0.06 | 0.134-0.268 | 12/5/50 |

PET = Polyethylene terephthalate
PET/PE = Polyethylene terephthalate/polyethylene
PET/EVOH/PE = Polyethylene terephthalate/ethyl vinyl alcohol/polyethylene A single sheet of laminated aluminium has a water vapour permeability value of 0.1 g/m$^2$/day and an oxygen permeability value of 0.1 g/m$^2$/day.

Despite the permeability data of single layer aluminium against water vapour and oxygen being very low, the Applicant has experimentally verified that, due to the handling which the material undergoes during the whole production chain leading to the manufacturing of the primary packaging, in actual fact said material, due to the deformations suffered during the various operations, is absolutely inadequate for guaranteeing an effective barrier against external agents, water vapour and oxygen.

The Applicant has conducted an experiment in which blister packs formed by a cavity made with a multilayer material PVC/PP/EVOH/PP/PVC and a cover made with single-layer sheet of laminated aluminium (blister 1) were placed on stability. It should be noted that the multilayer material PVC/PP/EVOH/PP/PVC has a central element consisting of PP/EVOH/PP to which a layer of PVC is coupled, on both the external layers, in order to improve the use practicality and enable the coupling with the aluminium.

In detail, the materials used in blister pack 1 are:
A): Multilayer material PVC/PP/EVOH/PP/PVC to produce the cavity of blister pack 1, and
B): Single-layer sheet laminated in aluminium (AL) to produce the cover of blister pack 1.

Said materials as per points A) and B) have the following characteristics (the numbers identify the thickness in μm).

Table A shows the composition of the material as per point A).

TABLE A

| Composition of the multilayer material A | Thickness μm | Weight g/m$^2$ |
|---|---|---|
| PVC | 250 | 350 |
| Adhesive | | 2 |
| PP/EVOH/PP | 100 | 92 |
| Adhesive | | 2 |
| PVC | 20 | 28 |
| Total | 370 ± 6% | 474 ± 6% |

Table A1 shows the barrier characteristics of the material as per point A).

TABLE A1

| Barrier characteristics of multilayer material A | Unit of measurement | Method | Values | Notes |
|---|---|---|---|---|
| Permeability to water vapour | g/m$^3$/24 hours | ASTM F 1249 | ≤1 | 38° C.-90% RH |
| Permeability to oxygen | cc/m$^3$/24 hours | ASTM D 3985 | ≤1 | 23° C.-100% RH |

Table B shows the composition of the material as per point B).

TABLE B

| Composition of material B | Thickness μm | Weight g/m$^2$ |
|---|---|---|
| Single-layer aluminium (AL) | 20 | 54 |
| Total | 20 ± 6% | 54 ± 6% |

Table B1 shows the barrier characteristics of the material as per point B).

TABLE B1

| Barrier characteristics of material B | Unit of measurement | Method | Values | Notes |
|---|---|---|---|---|
| Permeability to water vapour | g/m$^3$/24 hours | ASTM F 1249 | ≤1 | 38° C.-90% RH |
| Permeability to oxygen | cc/m$^3$/24 hours | ASTM D 3985 | ≤1 | 23° C.-100% RH |

Within the cavity of blister pack 1 soft gel capsules were packaged in gelatine containing an oily suspension of soy oil (77% w/w) and the probiotic microorganism B. breve BR03 DSM 16604 in microencapsulated form in a lipidic matrix (23% w/w and having a load of 100 billion CFU/g).

In a preferred embodiment of the invention, the probiotic microorganism is coated with at least a coating of vegetable origin.

In a preferred embodiment, the fats of vegetable nature are selected from the group comprising the saturated vegetable fats having a melting point comprised from 35° C. to 75° C., preferably comprised from 45 to 65° C. Advantageously from 50 to 60° C.

In a preferred embodiment, saturated vegetable fats can be used having a certain degree of hydrophilicity which can be selected from the group comprising mono- and di-glycerides of saturated fatty acids, the polyglycerols esterified with saturated fatty acids and the saturated fatty acids free.

The saturated fatty acids can be selected from the group comprising from 8 to 32 atoms of carbon, preferably from 12 to 28 atoms of carbon, even more preferably from 16 to 24 atoms of carbon.

Advantageously, the coating lipid is selected from the group comprising polyglyceryl-6-distearate, glyceryl dipalmitate-stearate, saturated fatty acids, hydrogenated vegetable fats of non lauric origin, hydrogenated palm fats or stearin.

In a first embodiment, the probiotic bacteria are coated with a single coating (mono-coated). In practice, single coating is created with one same lipid. Advantageously, the single coating is formed by polyglyceryl-6-distearate or by glyceryl dipalmitostearate (E471).

In a preferred embodiment, the weight ratio between the lyophilised microorganism and the lipidic coating substance coating it is 50:50 or 40:60.

In a second preferred embodiment, the probiotic bacteria are double coated. In practice, double coating is performed in succession with two lipids that are different from each other (double coating).

Advantageously, the two lipids are selected from the group comprising a hydrogenated palm fat (melting point=60° C.) and a glycerol dipalmitate-6-stearate (melting point=57-60° C.). The two lipids are sprayed onto the lyophilised bacteria in succession, that is, double coating is applied onto the lyophilised product: the first with hydrogenated palm fat and the second with glycerol dipalmitate-6-stearate in a 3:1 ratio to each other.

The soft gel capsules are made continuously by a system called a moulder in technical jargon which, starting from gelatine liquidised by melting at a suitable temperature, first forms a thin sheet by making the gelatine pass through two steel rollers; subsequently, two sheets of gelatine are moved towards each other and are sealed on the sides and on the bottom while the needle of a volumetric pump injects the oily suspension constituting the formulation into the pocket that is being formed. When the needle is retracted, the upper end is also sealed, causing the formation of the complete soft gel capsule. The soft gel capsules thus formed are dried in a hot air current and collected.

In a preferred embodiment the soft gel capsules comprise a lipophilic matrix, preferably a vegetable oil, for example corn oil, a thickener consisting of wax or fat with a melting point comprised from 50° C. to 80° C., for example bees' wax, or even more preferably glycerol monostearate.

The blister packs 1 containing the soft gel capsules are placed on stability, in parallel to reference primary packaging (reference barrier) known to the prior art for its impermeability characteristics against water vapour and oxygen in the following conditions:
i) at 25° C. and 60% RH, see Table 2
ii) at 30° C. and 65% RH, see Table 3.

The data in Tables 2 and 3 shows that the primary packaging of blister pack 1 does not represent a suitable barrier since strong mortality has been verified compared with the results of the soft gel capsules in the reference primary packaging. After 4, 5 months, there is a half-life of 339 days versus 28 days in case (i)—Table 2, and 192 days versus 17 days in case (ii)—Table 3.

In order to verify the cause of such mortality, the Applicant assessed the quantity of total water and free water present in the oily suspension, present in the soft gel capsule, containing the bacteria for the stability of 6 months compared with the initial one: no increase in either free water or total water was highlighted. This means that the mortality of the bacteria is not due to an increase in their metabolism made possible by the increase in bioavailable water but, due to another toxicity factor triggered by the entry of air and therefore of oxygen in the oily suspension. This evidence is borne out by the consideration that since it is soy oil, particularly rich in strongly unsaturated linoleic acid, it can be easily oxidised, quickly causing a radical cascade.

The Applicant then set out to find out whether the entry of oxygen had taken place through the layer of aluminium (AL) that constitutes the cover of the blister pack or through the multilayer material that constitutes the cavity of the blister pack.

Therefore, some stability tests were arranged, at the above-mentioned operating conditions, comparing the stability of the soft gel capsules packaged in sachets made with both faces in multilayer material PVC/PP/EVOH/PP/PVC like those of blister pack 1, with that of the same soft gel capsules packaged in multilayer sachets of PET/AL/PE that represent the reference barrier as per Tables 2 and 3.

The stability data obtained after 1 year shows substantial equivalence of the two types of packaging, highlighting that the layer that had enabled the passage of oxygen into blister pack 1 was the single layer of aluminium.

A possible explanation can be found considering that the sheet of aluminium has during manufacturing extremely good impermeability values against water vapour and oxygen, but that these performances could easily decline following handling and/or deformations due to the particular processing and storage conditions. It appears that the processing conditions contribute to increasing the permeability of the sheet of aluminium. Said increase in permeability is not due to cracks and/or collapses in the sheet of aluminium, but to deformations/dilations of the pores (intrinsically present) in the sheet of aluminium itself since the pores are a constructive element of the sheet of laminated aluminium.

The Applicant has developed a material for the production of primary packaging useful for the packaging of dietary products, cosmetics and medicinal specialities. The material of the present invention comprises at least two sheets/layers of aluminium, preferably laminated aluminium, coupled to each other through bonding with appropriate adhesive compounds that can be spread onto the external surface of the layer of aluminium and heated using the equipment and techniques known to a person skilled in the art.

In a preferred embodiment, the material of the present invention comprises or, alternatively, consists of number of sheets/layers of aluminium comprised from 2 to 10. In a preferred embodiment, the number of sheets/layers is 3 or 4 or 5. Advantageously, the number of sheets/layers is 2 or 3.

The thickness of each individual sheet/layer of aluminium is comprised from 2 to 50 µm, preferably from 5 to 40 µm. In a preferred embodiment, the thickness of each individual sheet/layer of aluminium is comprised from 7 to 30 µm, preferably from 8 to 20 µm. In another preferred embodiment, the thickness of each individual sheet/layer of aluminium is comprised from 8 to 20 µm, preferably from 10 to 15 µm. A person skilled in the art is aware that the values quoted above with reference to the thicknesses are susceptible to variations due to a tolerance which is comprised from ±2% to ±8%, usually comprised from ±4% to ±6%.

The weight the sheets/layers of aluminium used depends on the thickness of the sheet. For example, a sheet/layer of aluminium having a thickness of 20 µm has a weight comprised from 45 to 60 g/m$^2$, preferably from 50 to 55 g/m$^2$, for example 54 g/m$^2$. For example, a sheet/layer of aluminium having a thickness of 9 µm has a weight comprised from 45 to 30 g/m$^2$, preferably from 50 to 26 g/m$^2$, for example 24.30 g/m$^2$. A person skilled in the art is aware that the values quoted above with reference to the weights of the individual sheets/layers are susceptible to variations due to a tolerance which is comprised from ±2% to ±8%, usually comprised from ±4% to +6%.

In a preferred embodiment, the material of the present invention consists of a first and a second sheet each having a thickness comprised from 5 to 20 µm, preferably from 7 to 15 µm, for example, 10 µm. For example, two 10 µm sheets can be used. The individual sheets are coupled through equipment and techniques known to a person skilled in the art.

In another preferred embodiment, the material of the present invention consists of a first, a second and a third sheet each having a thickness comprised from 5 to 20 µm, preferably from 9 to 12 µm. For example, three 7 µm sheets or three 10 micron sheets can be used.

The individual sheets are coupled through equipment and techniques known to a person skilled in the art.

The multilayer aluminium material has the characteristics shown in Table C.

In a preferred embodiment, the material of the present invention consists of a first sheet having a thickness of 20 µm, which is coupled to a second sheet having a thickness of 9 µm. The multilayer aluminium material has the characteristics shown in Table C.

TABLE C

| Composition of material C | Thickness µm | Weight g/m$^2$ |
| --- | --- | --- |
| Aluminium (AL) | 20 | 54 |
| Adhesive | negligible | 2 |
| Aluminium (AL) | 9 | 24.30 |
| Total | 29 ± 6% | 80.3 ± 6% |

The barrier characteristics of material C are shown in Table C1.

TABLE C1

| Barrier characteristics of material C | Unit of measurement | Method | Values | Notes |
| --- | --- | --- | --- | --- |
| Permeability to water vapour | g/m$^3$/24 hours | ASTM F 1249 | ≤1 | 38° C.-90% RH |
| Permeability to oxygen | cc/m$^3$/24 hours | ASTM D 3985 | ≤1 | 23° C.-100% RH |

After producing the material C) the Applicant coupled a layer of polyamide (PA) to one face of said material and a layer of polyethylene or polyvinyl chloride to the other face of said material, hence making such material a multilayer material sealable with other different materials. Such new multilayer material is called "Material D" within the scope of this patent application, identified by the acronym PA/(AL)$_n$/PE, where n in this case equals 2.

After producing material D), the Applicant prepared a blister pack 2. The blister pack 2 consists of a cavity consisting of multilayer material PVC/PP/EVOH/PP/PVC and a cover produced with material D (PA/(AL)$_n$/PE) whose construction and barrier characteristics have already been described above. The blister packs 2 containing the same soft gel capsules as those tested above were placed on stability.

The stability data (Tables 6 and 7) conducted up to 18 months surprisingly shows that the barrier effect of material D is such as to prevent the entry not only of water vapour, but also of oxygen hence ensuring good stability to the soft gel capsules containing the probiotic bacteria. After 18 months there is a half-life of 352 days versus 341 days—Table 6, and 156 days versus 163 days—Table 7.

Advantageously, the material of the present invention enables the production of a blister pack that is more impermeable to water vapour and oxygen with respect to the known art whilst maintaining, at the same time, the breakage characteristics that allow breaking with simple finger pressure on the blister pack cavity and the necessary cutting characteristics to allow practical and easy use.

The Applicant found that a blister pack consisting of a cavity of a multilayer material coupled to a single layer of aluminium is not able to provide an adequate barrier effect as demonstrated by the data shown in Table 1.

Even if the decay mechanism has not yet been clarified in detail, it is however certain that when the material that comprises the primary packaging does not create a sufficient barrier against the entry of water vapour and oxygen, a series of cascading events occurs, particularly in an environment with a high degree of relative humidity above 60%, which includes:

the entry of air and, hence, oxygen into the cavity, oxygen that then crosses the external wall of the soft gel capsule entering the lipophilic matrix (oil contained in the soft gel capsule as a support).

In the oil, once the substances with naturally present anti-oxidant activity have been consumed (for example, polyphenols, tocopherols, free phenolic and esterified acids) or, voluntarily added (for example vitamin E) chain oxidation reaction is triggered with the formation of many species of free radicals and super-oxidised compounds, for example, aldehydes, ketones, trienes and conjugate acids.

Both the free radicals and the super-oxidised compounds are toxic for the probiotics.

The subject matter of the present invention is a multilayer material for packaging soft gel capsules containing a lipophilic matrix and microorganisms, comprising at least two layers of aluminium coupled to each other, where each layer of aluminium has a thickness comprised from 2 to 50 µm, said material having a first face coupled to a layer of polyamide (PA) and a second face coupled to a layer of polyethylene (PE) or polyvinyl chloride (PVC) giving a multilayer material of the type PA/(AL)n/PE or PA/(AL)n/PVC, where n is comprised from 2 to 10.

In a preferred embodiment of said multilayer material, the value of n is comprised from 2 to 5, more preferably from 3 to 4.

In an embodiment of said multilayer material, a first and a second layer of aluminium each have a thickness comprised from 5 to 20 µm, preferably from 7 to 15 µm, even more preferably 10 µm.

In an embodiment of said multilayer material, a first, second and a third layer of aluminium each have a thickness comprised from 5 to 20 μm, preferably from 9 to 12 μm.

In an embodiment of said multilayer material a first layer of aluminium has a thickness of 20 μm and a second layer of aluminium has a thickness of 9 μm, wherein the material has a permeability to water vapour ≤1 g/m³/24 hours measured with method ASTM F 1249 at a temperature of 38° C. and 90% relative humidity and a permeability to oxygen ≤1 cc/m³/24 hours measured with method ASTM D 3985 at a temperature of 23° C. and 100% relative humidity.

The subject matter of the present invention comprises a cover and a cavity coupled to each other to form a housing for containing soft gel capsules containing a lipophilic matrix, preferably a vegetable oil, and microorganisms dispersed in said lipophilic matrix, said cover being produced with the material described above, in accordance with one of the above-mentioned embodiments, said cavity being produced with a multilayer material selected from the group comprising: PP/PE, PP/EVOH/PP, PVC/PP/EVOH/PP/PVC, PS/PE, PS/PE/PS, PS/EVOH/PE and PA/AL/PVC.

In one embodiment said blister pack comprises a cover and a cavity coupled to each other to form a housing to contain soft gel capsules containing a lipophilic matrix, preferably a vegetable oil, and microorganisms dispersed in said lipophilic matrix, said cover and said cavity being produced with the material described above in accordance with one of the above-mentioned embodiments.

The subject matter of the present invention is a sachet comprising a first and a second face coupled to each other to define a closed volume, in which said first and/or second face comprise the material described above in accordance with one of the above-mentioned embodiments. The coupling can be performed, for, example, through thermosealing, using the techniques and the equipment known to a person skilled in the art. The sachet may be made of two faces coupled to each other through hot thermosealing (faces hot thermosealed) where each face consists of the multilayer material described above in one of the above-mentioned embodiments. In the closed volume, there are products containing microorganisms in contact with a lipophilic matrix, for example a vegetable oil, such as soft gel capsules for example.

The subject matter of the present invention is the use of a multilayer material in accordance with one of the above-mentioned embodiments, for giving stability to products containing microorganisms.

Said multilayer material as described above can give shelf life stability to products containing microorganisms that are found in contact with a lipophilic matrix, preferably a vegetable oil, from 18 to 36 months, preferably of 24 months, at a temperature comprised from 20 to 35° C., preferably from 25 to 30° C. The shelf life stability of products containing microorganisms (for example, a soft gel capsule comprising a vegetable oil, for example a corn oil, and microorganisms) against oxygen and water vapour.

TABLE 2

| Stability data at 25° C. 60% RH | T zero | | | | 25° C. 3 months | | | | 25° C. 4.5 months | | | | |
|---|---|---|---|---|---|---|---|---|---|---|---|---|---|
| | Data | Vital cells Billion/g | Aw | Total humidity % weight loss at 80° C. | Data | Days of stability | Vital cells Billion/g | Half-life days | Aw | Total humidity % weight loss at 80° C. | Data | Days of stability | Vital cells Billion/g | Half-life days |
| Multilayer sachet PET/AL/PE (Reference barrier) | 12/05/08 | 21 | 0.28 | 0.35 | 11/08/08 | 91 | 17.3 | 325 | 0.283 | 0.36 | 22/09/08 | 133 | 16 | 339 |
| Blister pack 1 multilayer (PVC/PP/EVOH/PP/PVC)/AL single layer | 12/05/08 | 21 | | | 11/08/08 | 91 | 16.5 | 262 | 0.285 | 0.35 | 22/09/08 | 133 | 0.8 | 28 |

TABLE 3

| Stability data at 30° C. 65% RH | T zero | | | | 30° C. 3 months | | | | 30° C. 4.5 months | | | | |
|---|---|---|---|---|---|---|---|---|---|---|---|---|---|
| | Data | Vital cells Billion/g | Aw | Total humidity % weight loss at 80° C. | Data | Days of stability | Vital cells Billion/g | Half-life Days | Aw | Total humidity % weight loss at 80° C. | Data | Days of stability | Vital cells Billion/g | Half-life Days |
| Multilayer sachet PET/AL/PE (Reference barrier) | 12/05/08 | 21 | 0.28 | 0.35 | 11/08/08 | 91 | 15 | 187 | 0.286 | 0.37 | 22/09/08 | 133 | 13 | 192 |
| Blister pack 1 multilayer (PVC/PP/EVOH/PP/PVC)/AL single layer | 12/05/08 | 21 | | | 11/08/08 | 91 | 13 | 132 | 0.288 | 0.37 | 22/09/08 | 133 | 0.1 | 17 |

TABLE 4

| Stability data at 25° C. 60% RH | T zero | | | 25° C. 3 months | | | | 25° C. 6 months | | | |
|---|---|---|---|---|---|---|---|---|---|---|---|
| | Data | Vital cells Billion/g | Aw | Total humidity % weight loss at 80° C. | Data | Days of stability | Vital cells Billion/g | Half-life Days | Aw | Total humidity % weight loss at 80° C. | Data | Days of stability | Vital cells Billion/g | Half-life Days |

| Stability data at 25° C. 60% RH | Data | Vital cells Bil-lion/g | Aw | % weight loss at 80° C. | Data | Days of stability | Vital cells Bil-lion/g | Half-life Days | Aw | % weight loss at 80° C. | Data | Days of stability | Vital cells Bil-lion/g | Half-life Days |
|---|---|---|---|---|---|---|---|---|---|---|---|---|---|---|
| Multilayer sachet PET/AL/PE (Reference barrier) | 07/10/08 | 21 | 0.3 | 0.35 | 07/01/09 | 92 | 17.5 | 350 | 0.285 | 0.36 | 08/04/09 | 183 | 14.3 | 330 |
| Multilayer sachet PVC/PP/EVOH/PP/PVC) | 07/10/08 | 21 | | | 07/01/09 | 92 | 16 | 235 | 0.288 | 0.36 | 08/04/09 | 183 | 14.6 | 349 |

| | | 25° C. 9 months | | | | 25° C. 12 months | | | | |
|---|---|---|---|---|---|---|---|---|---|---|
| Stability data at 25° C. 60% RH | Data | Days of stability | Vital cells Bil-lion/g | Half-life Days | Aw | Total humidity % weight loss at 80° C. | Data | Days of stability | Vital cells | Half-life Days |
| Multilayer sachet PET/AL/PE (Reference barrier) | 14/07/09 | 280 | 12.3 | 363 | 0.290 | 0.39 | 12/10/09 | 370 | 10.3 | 360 |
| Multilayer sachet PVC/PP/EVOH/PP/PVC) | 14/07/09 | 280 | 11.9 | 342 | 0.289 | 0.39 | 12/10/09 | 370 | 10.2 | 355 |

TABLE 5

| Stability data at 30° C. 65% RH | Data | Vital cells Bil-lion/g | Aw | Total humidity % weight loss at 80° C. | Data | Days of stability | Vital cells Bil-lion/g | Half-life Days | Aw | Total humidity % weight loss at 80° C. | Data | Days of stability | Vital cells Bil-lion/g | Half-life Days |
|---|---|---|---|---|---|---|---|---|---|---|---|---|---|---|
| | | T zero | | | | 30° C. 3 months | | | | 30° C. 6 months | | | | |
| Multilayer sachet PET/AL/PE (Reference barrier) | 07/10/08 | 21 | 0.3 | 0.35 | 07/01/09 | 92 | 15 | 190 | 0.291 | 0.40 | 08/04/09 | 183 | 11 | 196 |
| Multilayer sachet (PVC/PP/EVOH/PP/PVC) | 07/10/08 | 21 | | | 07/01/09 | 92 | 14.6 | 175 | 0.292 | 0.39 | 08/04/09 | 183 | 10.8 | 191 |

| | | 30° C. 9 months | | | | 30° C. 12 months | | | | |
|---|---|---|---|---|---|---|---|---|---|---|
| Stability data at 30° C. 65% RH | Data | Days of stability | Vital cells Bil-lion/g | Half-life Days | Aw | Total humidity % weight loss at 80° C. | Data | Days of stability | Vital cells Bil-lion/g | Half-life Days |
| Multilayer sachet PET/AL/PE (Reference barrier) | 14/07/09 | 280 | 7.5 | 188 | 0.293 | 0.41 | 12/10/09 | 370 | 4.1 | 157 |
| Multilayer sachet (PVC/PP/EVOH/PP/PVC) | 14/07/09 | 280 | 7.6 | 191 | 0.295 | 0.43 | 12/10/09 | 370 | 3.9 | 152 |

TABLE 6

| Stability data at 25° C. 60% RH | T zero | | | | 25° C. 3 months | | | | 25° C. 6 months | | | | | | 25° C. 9 months | |
|---|---|---|---|---|---|---|---|---|---|---|---|---|---|---|---|---|
| | Data | Vital cells Billion/g | Total humidity Aw | % weight loss at 80° C. | Data | Days of stability | Vital cells Billion/g | Half-life Days | Total humidity Aw | % weight loss at 80° C. | Data | Days of stability | Vital cells Billion/g | Half-life Days | Data | Days of stability |
| Multilayer sachet PET/AL/PE (Reference barrier) | 17/11/09 | 21 | 0.28 | 0.35 | 15/02/10 | 90 | 17.3 | 322 | 0.285 | 0.36 | 17/05/10 | 181 | 14.4 | 333 | 13/08/10 | 269 |
| Blister pack 2 multilayer PVC/PP/EVOH/PP/PVC/material D PA/(AL)n/PE, n = 2 (invention) | 17/11/09 | 21 | | | 15/02/10 | 90 | 17.6 | 353 | 0.288 | 0.36 | 17/05/10 | 181 | 14.1 | 315 | 13/08/10 | 269 |

| Stability data at 25° C. 60% RH | 25° C. 9 months | | 25° C. 12 months | | | | | | 25° C. 18 months | | | | | |
|---|---|---|---|---|---|---|---|---|---|---|---|---|---|---|
| | Vital cells Billion/g | Half-life Days | Total humidity Aw | % weight loss at 80° C. | Data | Days of stability | Vital cells Billion/g | Half-life Days | Total humidity Aw | % weight loss at 80° C. | Data | Days of stability | Vital cells Billion/g | Half-life Days |
| Multilayer sachet PET/AL/PE (Reference barrier) | 12.5 | 359 | 0.281 | 0.40 | 17/11/10 | 365 | 9.9 | 336 | 0.287 | 0.40 | 11/05/11 | 540 | 6.8 | 332 |
| Blister pack 2 multilayer PVC/PP/EVOH/PP/PVC/material D PA/(AL)n/PE, n = 2 (invention) | 12.9 | 383 | 0.287 | 0.41 | 17/11/10 | 365 | 10.4 | 360 | 0.284 | 0.41 | 11/05/11 | 540 | 7 | 341 |

TABLE 7

| Stability data at 30° C. 65% RH | T zero | | | | 30° C. 3 months | | | | 30° C. 6 months | | | | | | 30° C. 9 months | |
|---|---|---|---|---|---|---|---|---|---|---|---|---|---|---|---|---|
| | Data | Vital cells Bil-lion/a | Aw | % weight loss at 80° C. | Data | Days of stability | Vital cells Bil-lion/g | Half-life Days | Aw | % weight loss at 80° C. | Data | Days of stability | Vital cells Bil-lion/g | Half-life Days | Data | Days of stability |
| Multilayer sachet PET/AL/PE (Reference barrier) | 17/11/09 | 21 | 0.28 | 0.35 | 15/02/10 | 90 | 14.8 | 178 | 0.289 | 0.39 | 17/05/10 | 181 | 10.5 | 181 | 13/08/10 | 269 |
| Blister pack 2 multilayer PVC/PP/EVOH/PP/PVC/material D PA/(AL)n/PE, n = 2 (invention) | 17/11/09 | 21 | | | 15/02/10 | 90 | 15.1 | 189 | 0.292 | 0.41 | 17/05/10 | 181 | 10.7 | 186 | 13/08/10 | 269 |

TABLE 7-continued

| Stability data at 30° C. 65% RH | 30° C. 9 months | | 30° C. 12 months | | | | | | 30° C. 18 months | | | | | |
|---|---|---|---|---|---|---|---|---|---|---|---|---|---|---|
| | Vital cells Billion/g | Half-life Days | Total humidity | | Data | Days of stability | Vital cells Billion/g | Half-life Days | Total humidity | | Data | Days of stability | Vital cells Billion/g | Half-life Days |
| | | | Aw | % weight loss at 80° C. | | | | | Aw | % weight loss at 80° C. | | | | |
| Multilayer sachet PET/AL/PE (Reference barrier) | 7.3 | 176 | 0.289 | 0.41 | 17/11/10 | 365 | 4.4 | 162 | 0.289 | 0.41 | 11/05/11 | 540 | 1.9 | 156 |
| Blister pack 2 multilayer PVC/PP/EVOH/PP/PVC/material D PA/(AL)n/PE, n = 2 (invention) | 7.8 | 188 | 0.295 | 0.43 | 17/11/10 | 365 | 4.6 | 167 | 0.295 | 0.43 | 11/05/11 | 540 | 2.1 | 163 |

The invention claimed is:

1. A multilayer material for packaging soft gel capsules containing a lipophilic matrix and microorganisms, the multilayer material comprising
at least two layers of aluminum directly bonded to each other through adhesive compounds, where each layer of aluminum has a thickness comprised from 2 to 50 µm, said material having a first face coupled to a layer of polyamide (PA) and a second face coupled to a layer of polyethylene (PE) or polyvinyl chloride (PVC) giving a multilayer material of the type PA/ (AL)n/PE or PA/ (AL)n/PVC, where n is comprised from 2 to 10.

2. The multilayer material in accordance with claim 1, wherein n is from 2 to 5.

3. The multilayer material in accordance with claim 1, wherein a first and a second layer of aluminum each have a thickness from 5 to 20 µm.

4. The multilayer material in accordance with claim 1, wherein a first, a second and a third layer of aluminum have a thickness from 5 to 20 µm.

5. The multilayer material in accordance with claim 1, wherein a first layer of aluminum has a thickness of 20 µm and a second layer of aluminum has a thickness of 9 µm, wherein the material has a permeability to water vapour ≤1 g/m$^3$/24 hours measured with method ASTM F 1249 at a temperature of 38° C. and 90% relative humidity and a permeability to oxygen ≤1 cc/m$^3$/24 hours measured with method ASTM D 3985 at a temperature of 23° C. and 100% relative humidity.

6. A blister pack comprising
a cover and a cavity coupled to each other to form a housing for containing soft gel capsules containing a lipophilic matrix, and microorganisms dispersed in said lipophilic matrix, said cover being produced with the material in accordance with claim 1, wherein said cavity being produced with a multilayer material selected from the group comprising: PP/PE, PP/EVOH/PP, PVC/PP/EVOH/PP/PVC, PS/PE, PS/PE/PS, PS/EVOH/PE and PA/AL/PVC.

7. A blister pack comprising a cover and a cavity coupled to each other to form a housing to contain soft gel capsules containing a lipophilic matrix, and microorganisms dispersed in said lipophilic matrix, said cover and said cavity being produced with the material in accordance with claim 1.

8. A sachet comprising a first and a second face coupled to each other to define a closed volume, wherein said first and/or second face comprise a material in accordance with claim 1.

9. A method for giving stability to a product containing microorganisms, the method comprising packaging the product containing microorganism with a multilayer material in accordance with claim 1 to provide a packed product containing microorganisms.

10. The method according to claim 9 wherein in the packed product containing microorganisms, the product containing microorganism is
in contact with a lipophilic matrix, from 18 to 36 months at a temperature comprised from 20 to 35° C.

11. The method according to claim 9, wherein the stability of the product containing the microorganisms is against oxygen and water vapour.

12. The multilayer material in accordance with claim 1, wherein n is comprised from 3 to 4.

13. The multilayer material in accordance with claim 1, wherein a first and a second layer of aluminium each have a thickness comprised from 7 to 15 µm.

14. The multilayer material in accordance with claim 1, wherein a first and a second layer of aluminium each have a thickness of 10 µm.

15. The multilayer material in accordance with claim 1, wherein a first, a second and a third layer of aluminium have a thickness comprised from 9 to 12 µm.

16. The blister pack in accordance with claim 6, wherein the lipophilic matrix is a vegetable oil.

17. The blister pack in accordance with claim 7, wherein the lipophilic matrix is a vegetable oil.

18. The method in accordance with claim 10, wherein the lipophilic matrix is a vegetable oil.

19. A packaged product containing microorganism, the packaged product comprising
a lipophilic matrix and microorganisms packaged with a multilayer material in accordance to claim 1.

20. The packaged product containing microorganisms in accordance with claim 19, wherein the lipophilic matrix is a vegetable oil.

* * * * *